(12) United States Patent
Tsuzuki et al.

(10) Patent No.: US 7,587,960 B2
(45) Date of Patent: Sep. 15, 2009

(54) PARKING BRAKE OPERATING APPARATUS

(75) Inventors: Hiroaki Tsuzuki, Toyota (JP); Takumi Uno, Toyota (JP); Toshiro Takeshima, Toyota (JP)

(73) Assignee: Toyoda Iron Works Co., Ltd., Aichi-ken (JP)

( * ) Notice: Subject to any disclaimer, the term of this patent is extended or adjusted under 35 U.S.C. 154(b) by 157 days.

(21) Appl. No.: 11/546,385

(22) Filed: Oct. 12, 2006

(65) Prior Publication Data
US 2008/0041673 A1 Feb. 21, 2008

(30) Foreign Application Priority Data
Aug. 17, 2006 (JP) ............................. 2006-222438

(51) Int. Cl.
*G05G 1/04* (2006.01)
(52) U.S. Cl. ...................................... 74/523
(58) Field of Classification Search ............... 74/89.17, 74/473.21, 473.22, 473.23, 473.24, 473.25, 74/523, 526, 527, 529, 535, 536, 537, 538, 74/575, 576, 577 R, 577 M; 180/271, 274, 180/275; 188/2 R
See application file for complete search history.

(56) References Cited
U.S. PATENT DOCUMENTS
2,272,174 A * 2/1942 Jandus ....................... 74/537

5,131,288 A * 7/1992 Barlas ......................... 74/512

FOREIGN PATENT DOCUMENTS
| EP | 1205368 A2 * | 5/2002 |
| JP | 64-39166 | 3/1989 |
| JP | 2002-145028 | 5/2002 |
| JP | 2004-13746 | 1/2004 |

* cited by examiner

*Primary Examiner*—Vicky A Johnson
(74) *Attorney, Agent, or Firm*—Finnegan, Henderson, Farabow, Garrett & Dunner LLP

(57) ABSTRACT

A parking brake operating apparatus (10), comprises (a) a supporting member (12) disposed integral with a vehicle, (b) an operating member (16) disposed in the supporting member to pivot about a first axis, and actuates a parking brake by a braking operation from an initial position thereof, (c) a ratchet (30) having many engaging teeth (28) formed along an arc centering on the first axis, and disposed in the supporting member integrally therewith, and (d) a pawl (32) disposed in the operating member, riding over the many engaging teeth during the braking operation of the operating member, and engaging with the teeth in the brake actuating position of the operating member to prevent returning pivotal movement of the operating member toward the initial position side for maintaining an actuating state of the parking brake. In such parking brake operating apparatus, (e) a first engaging tooth (28*a*) in the many engaging teeth of the ratchet over which the pawl rides first during the braking operation of the operating member from the initial position is determined higher in a height than other engaging teeth (28*e*).

9 Claims, 3 Drawing Sheets

(a)

(b)

(a)

(b)

PARKING BRAKE OPERATING APPARATUS

This application is based on Japanese Patent Application No. 2006-222438 filed on Aug. 17, 2006, and content of which is incorporated herein by reference.

BACKGROUND OF THE INVENTION

1. Field of the Invention

The present invention relates to a parking brake operating apparatus, and more particular it relates to a technique for preventing occurrence of an erroneous operation upon spring-up of an operating member resulted from shake of a vehicle body during a rough road running.

2. Discussion of Related Art

A parking brake operating apparatus is operated by a driver to actuate a parking brake of a vehicle, and it includes (a) a supporting member, (b) an operating member, (c) a ratchet, and (d) a pawl has been known. The supporting member is disposed in a vehicle body integrally therewith. The operating member is disposed in the supporting member pivotally rotatable i.e., pivotable about a first axis within a limited angle, and is brake-operated from an initial position thereof to actuate the parking brake. The ratchet has many engaging teeth formed along an arc centering on the first axis, and is disposed in one of the supporting member and the operating member integrally therewith.

The pawl is disposed in other of the supporting member and the operating member, and rides over the ratchet and then engages therewith. In detail, the pawl rides over the many engaging teeth during the braking operation of the operating member, but it engages with many engaging teeth upon the braking operation to prevent returning pivotal movement of the operating member toward the initial position side, to maintain the actuating state of the parking brake.

Patent documents 1 to 3 (Patent document 1: Japanese Patent Application Publication No. 2004-13746; Patent document 2: Japanese Utility Model Application Publication No. S64-39166; Patent document 3: Japanese Patent Application Publication No. 2002-145028) disclose examples of the parking brake operating apparatuses. Among them, the patent documents 1 and 2 disclose one type in which an operating lever as the operating member is disposed at side of a driver's seat, and it is held in a substantially horizontal posture with a grip portion extending forward in the vehicle in the initial position. The patent document 3 discloses other type in which an operating lever is disposed at a console box portion in front of the driver's seat, and it is held in a substantially vertical posture with a grip portion extending upward in the vehicle in the initial position.

However, the parking brake operating apparatuses disclosed in the patent documents 1 and 2 suffer from following drawback. The operating lever may spring up due to large shake of the vehicle body running on the rough road, which allows the pawl to ride over the first engaging tooth for pivoting of the operating lever. As a result, a parking lamp may be erroneously lightened. Especially, in recent years, a demand as an interior equipment is increasingly required for the operating lever. Specifically, in view of balance with a side edge shape and an inclined angle of adjacent interior equipment, the operating lever, in the initial position thereof, is not held in the horizontal posture but is held in an inclined posture inclined by a predetermined angle. In such case, the operating lever may spring up from the initial position more easily.

For preventing such spring-up of the operating lever, following manners are considered. One manner is to increase a bias force of a bias means for biasing the pawl, so that load of the pawl required to ride over the first engaging tooth increases. Other manner is to bias the operating lever toward the initial position by a plate spring and the like. However, in the former case, the increase of bias force for the pawl leads to an increase of operating force of a release knob which is pushed upon releasing of the parking brake, thus worsening an operability. In the latter case, the additional member required for biasing the operating lever toward the initial position increases the cost.

Incidentally, in the apparatus disclosed in the patent document 2, in the state with the operating lever being held in the initial position, the pawl rides on a protruded portion protruded larger than the engaging teeth. As a result, there is fear that the operating lever pivoting from the initial position tends to ride over the engaging teeth more easily. Also feared is that, upon returning pivotal movement of the operating lever for the brake releasing, the pawl abuts onto the protruded portion, which requires strong a push-in of the release knob, thus worsening the operability of the operating member.

In the parking brake operating apparatus disclosed in the patent document 3, the operating lever disposed in the substantially vertical posture may easily fall down by a small shake to be pivoted from the initial position. To avoid this, a positioning means is provided for engaging a grip portion at a top of the operating lever with the console box for the positioning. However, such positioning means using the engagement between the operating lever and the console box suffers from following drawbacks. Firstly, both the operating lever and the console box become complicated in the shape thereof which leads to increase of the cost. Secondary, a loose positioning resulted from a slight dimensional error or an assembling error may shake the operating lever or disengage the positioning means, which causes a fall-down of the operating lever from the initial position.

To the contrary, a tight positioning by the positioning means requires the larger actuating force of the operating lever, thereby worsening the operability. Alternatively, it establishes a half or semi engaged state thereof, resulting in the fall-down of the operating lever during the vehicle running, upon returning pivotal movement of the operating lever toward the initial vertical position.

The present invention is made in view of the above mentioned circumstance and therefore has an object to prevent erroneous operation such as lightening of a brake lamp from occurring resulting from a spring-up of the operating member upon shaking of the vehicle body during the vehicle running on the rough road easily and cheaply, without worsening the operability or increasing the number of members.

SUMMARY OF THE INVENTION

For achieving the above object, the present invention is featured by a parking brake operating apparatus comprises (a) a supporting member disposed integral with a vehicle, (b) an operating member disposed in the supporting member to pivot about a first axis, and actuates a parking brake by a braking operation from an initial position to a brake actuating position thereof, (c) a ratchet having many engaging teeth formed along an arc centering on the first axis, and disposed in one of the supporting member and the operating member integrally therewith, and (d) a pawl disposed in other of the supporting member and the operating member, riding over the many engaging teeth during the braking actuating of the operating member toward the brake actuating position, and engaging with the many engaging teeth at the brake actuating position to prevent returning pivotal movement of the operating member toward the initial position side for maintaining an actuating state of the parking brake.

In the parking brake operating apparatus, (e) a first engaging tooth in the many engaging teeth of the ratchet over which the pawl rides first during the braking actuation of the operating member from the initial position to the brake actuating position is determined higher in a height than other engaging teeth.

According to such parking brake operating apparatus, the height of the first engaging tooth over which the pawl rides first when the operating member is brake-actuated from the initial position is determined higher than the height of other engaging teeth. As a result, the operating member is hardly pivoted toward the brake actuating side from the initial position to the brake actuating position.

With this, even upon the occurrence of large shake of the vehicle body in the rough road running, spring-up of the operating member that is riding-over of the pawl relative to the first engaging tooth is suppressed. This can prevent an erroneous lightening of a parking brake lamp and a half actuating state of the parking brake. Noted is that in the present invention, spring-up of the operating member can be prevented only by heightening the first engaging tooth, without affecting the operability for releasing the parking brake such as pushing-in of the release knob.

In addition, at the protruded portion of the first engaging tooth protruded larger than the other engaging teeth, the inclined surface is provided for allowing, during engagement with the pawl upon returning pivotal movement of the operating member, the pawl to ride over the first engaging tooth with contacting therewith in the direction reverse to the riding over direction upon the braking actuation.

As a result, upon returning pivotal movement of the operating member if the pawl unexpectedly engages with the inclined surface, the operating member does not go back toward the other teeth side, i.e., the brake actuation side to be locked. Thus, the operation member can be pivoted in the returning direction to the initial position securely i.e., certainly, whereby the erroneous lightening of the parking brake lamp and occurrence of the half operating state of the parking brake can be prevented securely i.e., certainly, without worsening the operability.

The pivotal force required for pivoting the operating member in the brake actuating direction is preferably determined larger when the operating member is pivoted until the pawl rides over the first engaging tooth than when the operating member is pivoted until the pawl rides over the other engaging teeth. An inclined angle of the inclined surface of the first engaging tooth of the ratchet can be determined such that, upon application of a force from the pawl to the inclined surface, a force component in a direction of the inclined surface is larger than a friction force between the inclined surface and the pawl.

Also, the pawl can have an engaging portion engaging with a recess formed at this side i.e., on the initial position side of the first engaging portion of the ratchet and a tooth bottom of the other engaging teeth, and is attached to the supporting member to be pivotable about a second axis parallel to the first axis. Further, the pawl can assume an engaging position i.e., posture engaging with the recess of the first engaging tooth of the ratchet and teeth bottoms of the other engaging teeth, a first ride-over position i.e., posture riding over the first engaging tooth, and a second ride-over position i.e., posture riding over the other engaging teeth.

In the returning pivotal movement of the operating member to the initial position, with the pawl being held at the first ride-over position, the engaging portion of the pawl preferably does not contact with the inclined surface. In addition, while the pawl is held at the engaging position with the operating member being at the initial position, the engaging portion of the pawl preferably abuts onto i.e., contacts with an abutment surface i.e., contact surface of the first engaging tooth formed at the side of the recess. In this case, if the pawl is distant from the first engaging tooth, as the operating member springs up due to shake of the vehicle body, the pawl may ride over the first engaging tooth by the inertia of the sprung-up operating member. To avoid this, a space distance formed between the first engaging tooth and the pawl is preferably minimized, that is the pawl preferably contacts with the first engaging tooth.

Preferably, the operating member further includes a stopper abutting onto or contacting with the supporting member to determine the initial position of the operating member. Here, the stopper can be provided for regulating i.e., determining the operating member in the initial position. That is, the operating member is regulated i.e., determined by the stopper so that with the operating member being held in the initial position, the pawl is positioned at this side of the first engaging tooth. In other words, upon the returning pivotal movement of the operating member, the pawl is positioned at a point i.e., location completely ridden over the first engaging tooth. In this case, when the pawl is distant from the first engaging tooth, if the operating member springs up due to shake of the vehicle body, the pawl may ride over the first engaging tooth by an inertia of the sprung-up operating member.

As the operating member, an operating lever is disposed, which has a proximal end near to the first axis to which a parking cable is connected, on which the pawl is disposed pivotally about a second axis parallel to the first axis, and which has a grip portion at a distal end distant from the proximal end to be gripped by the driver.

Here, the operating lever can have (a) a bias means and (b) a release knob. The bias means pivotally biases the pawl in an engaging direction about the second axis to be engaged with the engaging teeth. The release knob is disposed at a top of the grip portion to be pushed in, and causes upon push-in thereof to pivot the pawl via a release rod in a release direction against the bias force of the bias means for releasing the engagement thereof with the engaging teeth.

As the bias means, a return spring spanning between the operating lever and the release knob is preferably provided. This return spring not only biases the release knob in a direction to be pushed out from the top of the grip portion, but biases the pawl via the release rod in the engaging direction. Noted is that the return spring and the bias means can be provided separately. Also noted is that the bias means for biasing the pawl in the engaging direction is not necessary provided, but the pawl can be constructed to pivot in the engaging direction by its own weight.

The above operating lever can have various modes. For example, it is disposed inside of the driver's seat, and is held in the initial position thereof in a substantially horizontal posture where the grip portion extends forward in the vehicle. However, the operating lever may be inclined in the initial position by a predetermined angle relative to the horizontal direction. In addition, the operating lever can be disposed on a console box provided in front of the driver's seat and the like, and is held in a substantially vertical posture in the initial position where the grip portion extends upwardly in the vehicle.

Also, the operating lever is not necessarily pivoted about the first axis as one member but a folding type in which an intermediate portion is bent, can be employed. Further, the present invention can be applied to a depressing type parking brake operating apparatus which employs a depressing pedal as the operating member.

For the parking brake operating apparatus of the present invention, a parking brake switch is provided, which turns on or turns off in a contact thereof depending on the operating member being held in the initial position or not, for detecting whether the parking brake is in an actuating state or not. In the actuating state of the parking brake, a parking brake lamp disposed on an instrumental panel on the driver's seat and the like is lightened.

BRIEF DESCRIPTION OF THE DRAWINGS

FIG. 1 a set of views showing a parking brake operating apparatus which is one embodiment of the present invention, in which FIG. 1A is a front view partially broken, and FIG. 1B is an enlarged view of a ratchet, a pawl and therearound;

FIG. 3 is set of views explaining, in the parking brake operating apparatus shown in FIG. 1, a returning pivotal movement of the operating lever, in which FIG. 3A is a case where a release amount D is formed with a release knob being fully pushed in, and FIG. 3B is a case where the pawl is engaged with the first engaging tooth with the release knob being pushed by the half.

PREFERRED EMBODIMENT OF THE INVENTION

Hereinafter, an embodiment of the present invention will be explained with reference to attached drawings.

Figure 1:
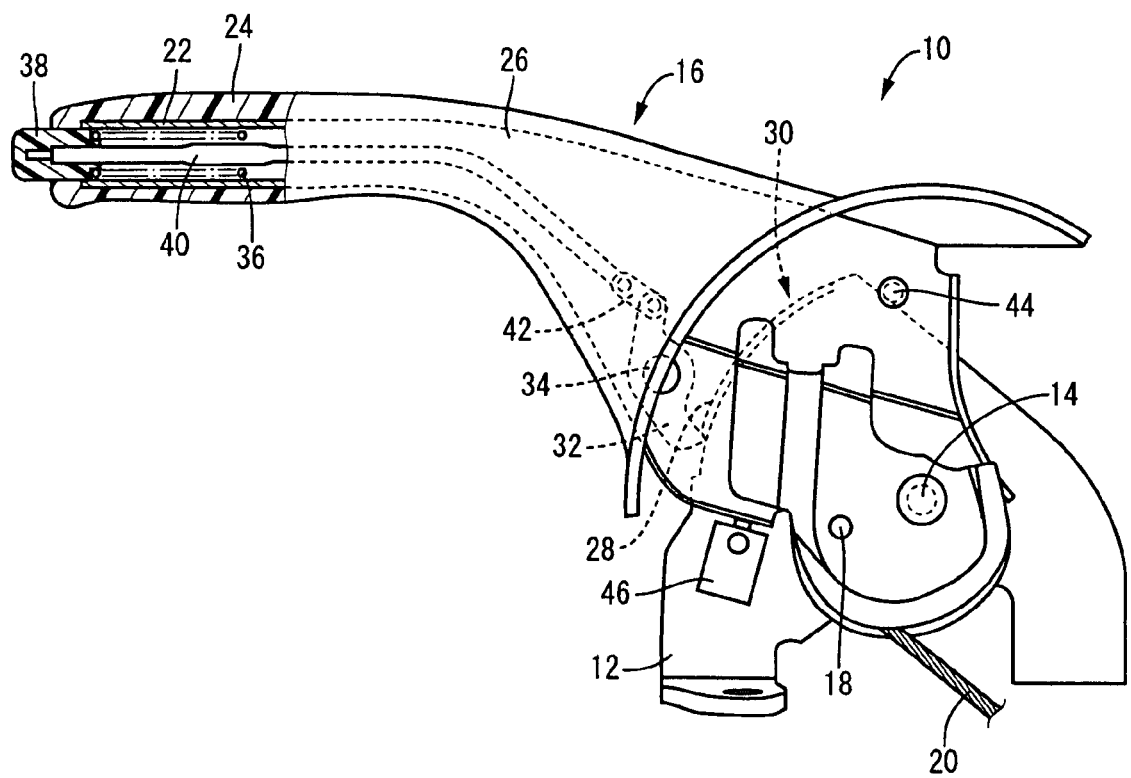
Figure 1:
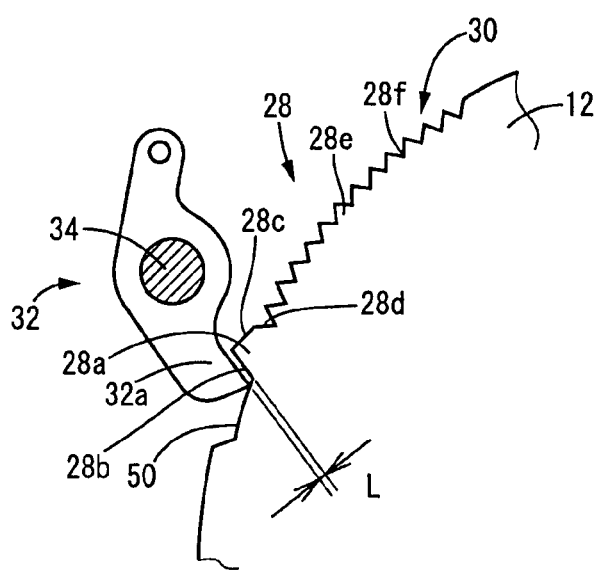
Figure 2:
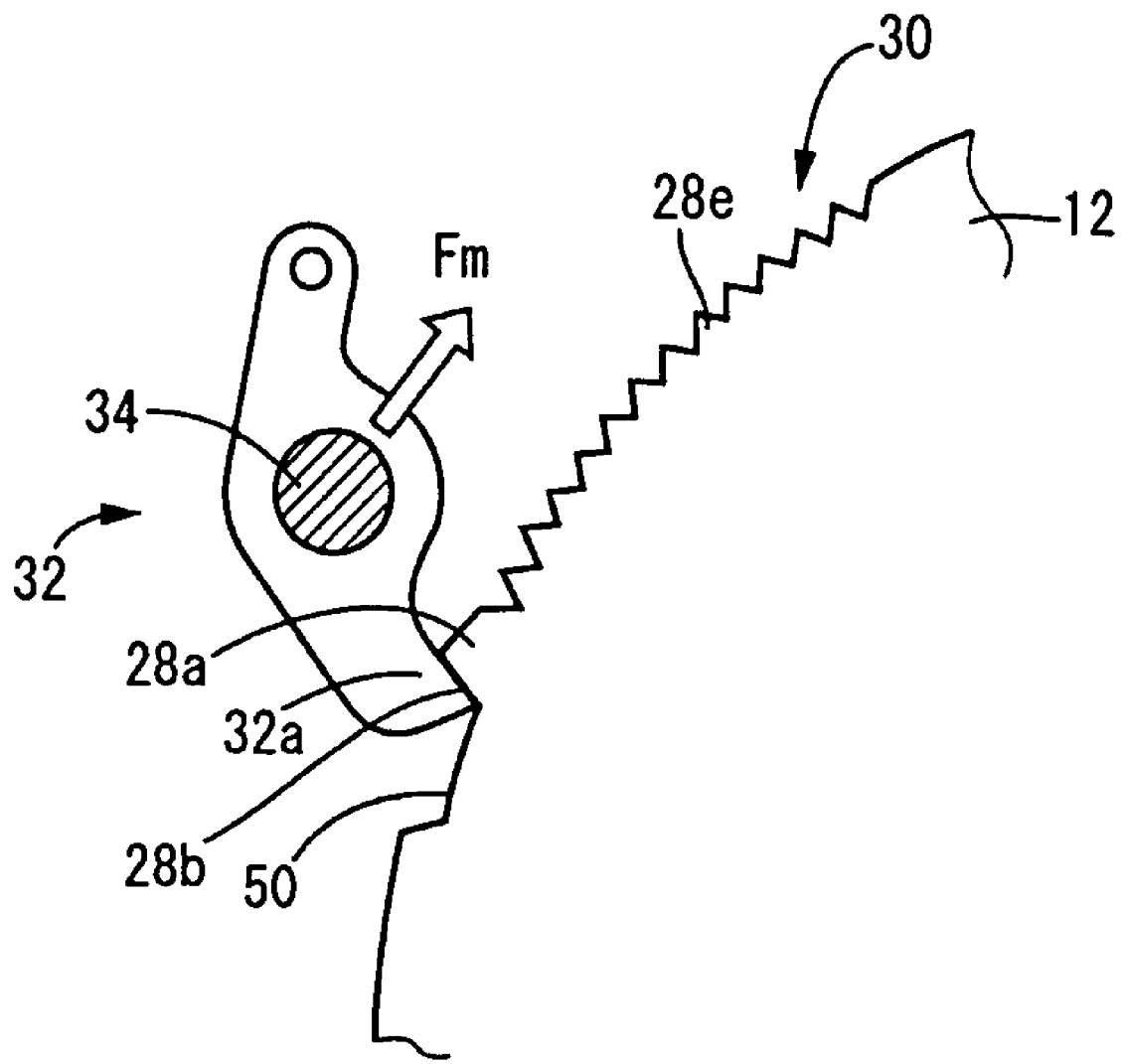
FIG. 2 is a view explaining, in the parking brake operating apparatus shown in FIG. 1, difficulty for the pawl to ride over the first engaging tooth.

FIG. 1A is a front view showing a parking brake operating apparatus 10 which is one example of the present invention. The parking brake operating apparatus 10 includes a sector 12 and an operating lever 16. The sector 12 consisting of a flat plate is fixed substantially vertically to a floor of an unillustrated vehicle body, and the operating lever 16 is pivotally supported by the sector 12 via a support pin 14 about an axis thereof within a limited angle. In the operating lever 16, a brake cable 20 is connected to a proximal end thereof via a connecting pin 18, while a cylindrical portion 22 is formed integrally therewith at a distal end distant from the support pin 14. A resin cover 26 having a grip 24 fitted to the cylindrical portion 22 is integrally attached to the operating lever 16.

As the operating lever 16 is pivoted in the clockwise direction about the support pin 14 in FIG. 1A for the braking actuation with gripping the grip 24, the brake cable 20 is tightened to operate an unillustrated parking brake of the driving wheel. Here, the sector 12 corresponds to the claimed supporting member, the axis of supporting pin 14 corresponds to the claimed first axis, the operating lever 16 corresponds to the claimed operating member, and the grip 24 corresponds to the claimed gripping portion.

The sector 12 is provided with many engaging teeth 28 spaced in the pivoting direction of the operating lever 16 along an arch thereof centering on the support pin 14 to construct a ratchet 30. The many engaging teeth 28 includes one higher engaging tooth 28a at side of recess 50 and plural lower other engaging teeth 28e at side opposite to the recess 50, as will be fully explained later. On the operating lever 16, a pawl 32 engaging with the engaging teeth 28 is disposed to be pivoted about a pin 34 parallel to the support pin 14 within a limited angle. At an open top end of the cylindrical portion 22, a release knob 38 is disposed to be pushed in against bias force of a return spring 36 disposed in the cylindrical portion 22. To the release knob 38, one end portion of a release rod 40 is connected.

The return spring 36 is comprised of a compression coil spring of which one end is abutted onto the release knob 38 and other end is abutted onto an unillustrated engaging portion formed inside of the cylindrical portion 22 by an internal bending. Thus, the return spring 36 biases the release knob 38 to push out from the cylindrical portion 22 and further from the grip 24. Other end of the release rod 40 is connected to the pawl 32 via a connecting link 42, so that the pivoting force in the counter-clockwise direction about the pin 34 in FIG. 1A acts onto the pawl 32 based on biasing force of the return spring 36. A protruded length of the release knob 38 protruding from the grip 24 is determined as the sector 12 contacts with the pawl 32. An axis of the pin 34 corresponds to the claimed second axis. As will be explained next, the pawl 32 is pivoted clockwise i.e., in the clockwise direction by push-in of the release knob 38 via a connecting rink 42.

The parking brake operating apparatus 10 of this embodiment is disposed at side of a driver's seat, and in an initial position shown in FIG. 1A, the operating lever 16 is held in a substantially horizontal posture in which the grip 24 extends forward of the vehicle. When the operating lever 16 is pulled up clockwise about the support pin 14 from the initial position shown in FIG. 1A to a brake actuating position (not shown) as the braking actuation, the brake cable 20 is tightened to actuate the parking brake. Noted is that the brake actuating position varies depending on slackness of the brake cable 20, wear of brake shoes (not shown) and the like.

Here, the braking actuation causes the pawl 32 to pivot about the pin 34 against the bias force of the spring 36, to sequentially ride over the engaging teeth 28 of the ratchet 30. An engaged state between the pawl 32 and the engaging teeth 28 of the ratchet 30 is maintained upon stoppage i.e., halt of the braking actuation, so that the returning pivotal movement of the operating lever 16 is prevented to thereby maintain the parking brake in the actuating state.

In this brake actuating position, if the release knob 38 is pushed in the cylindrical portion 22 against bias force of the return spring 36 with further pulling up the operating lever 16, the pawl 32 pivots clockwise about the pin 34 to release the engagement with the engaging teeth 28. A returning pivotal movement of the operating lever 16 in the counter-clockwise direction about the support pin 14 from this state loosens the brake cable 20 to thereby release the actuating state of the parking braking. As apparent, the return spring 36 also serves as the biasing means for biasing the pawl 32 in the engaging direction with the engaging teeth 28, in addition to the bias of the release knob 38 in the push-out direction.

The initial position of the operating lever 16 is determined where a stopper pin 44 provided on the operating lever 16 as the stopper comes into contact with the sector 12, and the operating lever 16 is held in this initial position both by the own weight and the contacting load acting between the pawl 32 and the ratchet 30. In the sector 12, a parking brake switch 46 is disposed, of which contact turns on or turns off depending on the position of the operating lever 16. That is, the brake switch 46 detects whether the parking brake is in the actuating state or not, based on the fact the operating lever 16 being held in the initial position or not.

The turn-on and turn-of the contact of the parking brake switch is switched by the clockwise pivotal movement of the operating lever 16 about the support pin 14 from the initial position shown in FIG. 1A to the brake actuating position. This switching lightens a parking brake lamp disposed in an unillustrated instrumental panel and the like of the driver' seat via a control device having a computer and the like. Lightening of the parking brake lamp primarily intends to alarm i.e., to notify the actuating state of the parking brake. However, in this embodiment, the parking brake lamp is lightened, regardless of the actual actuation of the parking brake, by the switching of turn-on and turn-off of the contact in the operating lever 16 caused by the pivotal movement of the operating lever 16 more than a predetermined angle.

FIG. 1B is an enlarged view showing an engaged state between the ratchet 30 and the pawl 32 where the operating lever 16 is held in the initial position thereof. As apparent, a first engaging tooth 28a in the many engaging teeth 28 of the ratchet 30 over which the pawl 32 first rides upon braking actuation of the operating lever 16 from the initial position is determined higher in the height thereof than that of other engaging teeth 28e. The first engaging tooth 28a has a contact abutment surface 28b at side of the recess 50, an inclination surface 28c to be explained later, and a locking surface 28d at side opposite to the recess 50. The plural engaging teeth 28e have locking grooves 28f formed between adjacent engaging teeth 28e. The height of the first engaging tooth 28a and that of the engaging teeth 28e are defined by dimensions from the axis of the support pin 14 to the respective tip ends. In the state where the operating lever 16 is held in the initial position, the pawl 32 having an engaging portion 32a at a lower end thereof is held in this side of the first engaging tooth 28a, that is at the position completely ridden over the first engaging tooth 28a upon return pivotal movement of the operating lever 16, before the pivotal operation or after the returning operation of the operating lever 16. The operating lever 16 is held in the initial position to engage into or contact with a recess 50 by the bias force of the return spring 36 as is in the engaging posture. This recess 50 has substantially the same depth as the locking grooves 28f of the many engaging teeth 28e.

The pawl 32 can assume, in addition to the above engaging position i.e., posture, a first ride-over position i.e., posture and a second ride-over position i.e., posture. In the first ride-over position, the pawl 32 rides over the first engaging tooth 28a when the operating lever 16 is pivoted to the brake actuating position and to the initial position. In the second ride-over position, it rides over the engaging teeth 28e in the pivotal movement of the operating lever 16 to the brake operating position and to the initial position. The pawl 32 is in the engaging position upon a non-push-in of the release knob 38, in the first ride-over position upon a full push-in of the knob 38, and in the second ride-over position upon a half push-in of the knob 38.

The operating lever 16 is pivoted about the supporting pin 14 against a tension of the brake cable 20 and bias force of the return spring biasing the pawl 32. Here, if tension of the brake cable 20 is not considered, the height of the first engaging tooth 28a is determined higher than that of the other engaging teeth 28, which results in that a pivotal force Tm is larger than a pivotal force Fo. The pivotal force Fm is required for pivoting the operating lever 16 until the pawl 32 rides over the first engaging tooth 28a toward the brake actuating position. The pivotal force Fo is required for pivoting the operating lever 16 in the brake actuating direction until the pawl 32 rides over the other engaging teeth 28e, that is rides over the engaging teeth of the same height in the conventional art.

When tension of the brake cable 20 is not considered, magnitude of the pivotal forces Fm and Fo depend on the pivotal amount of the pawl 32, that is deformed amount of the return spring 38. This pivotal force Fo is equal to that required for pivoting the operating lever 16 toward the brake actuating direction, when the pawl 32 rides over the engaging teeth 28e all having the same height in the conventional art. With this, even when the operating lever 16 springs up due to the large shake of the vehicle body during the vehicle running on the rough road, the operating lever 16 is prevented from pivoting in the brake actuating direction until the pawl 32 rides over the first engaging tooth 28a.

Here, the initial position of the operating lever 16 upon the non-actuation of the parking brake is regulated i.e., determined by the pin 44. With the operating lever 16 being held in the initial position, the pawl 32 distant from the first engaging tooth 28a tends to ride over the first engaging tooth 28a by an inertia of the operating lever 16 resulted from the spring-up thereof upon the large shake of the vehicle body. For this reason, a space dimension L (refer to FIG. 1B) between the abutment surface 28b of the first engaging tooth 28a and the engaging surface 32a of the pawl 32, with the operating lever 16 being held in the initial position, is preferably minimized.

For example, the space dimension is determined as zero for allowing a mutual contact of the first engaging tooth 28a and the pawl 32. With this, an influence of the inertia is removed, whereby spring-up of the operating lever 16 before or until the pawl 32 rides over the engaging teeth 28 can be further suppressed even upon occurrence of the great shake of the vehicle body.

On the other hand, if a protruded dimension of the first engaging tooth 28a is determined too large, there is a fear that the pawl 32 may engages with the largely protruded first engaging tooth 28a in the returning pivotal movement of the operating lever 16 from the brake actuating position of the parking brake to the initial position by push-in of the release knob 38.

Figure 3:
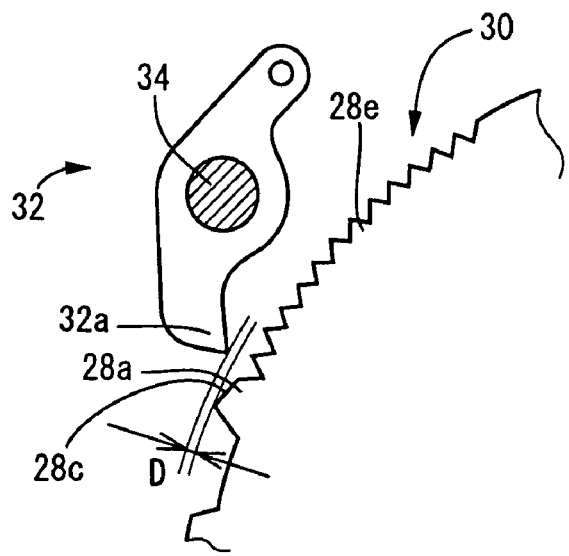
Figure 3:
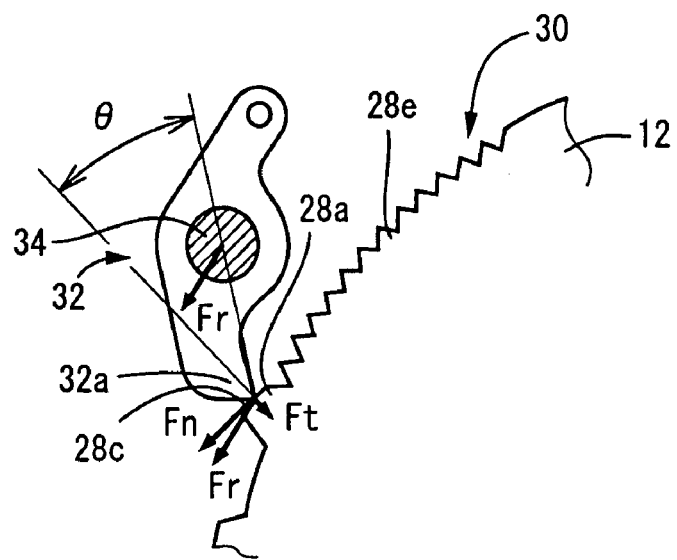

In view of this, in this embodiment, as shown in FIG. 3A, the height of the first engaging tooth 28a is so selected i.e., determined that, with the full push-in of the release knob 38 to pivot the pawl 32 clockwise, the release amount D is left i.e., secured between the first engagement surface 28a of the first engaging tooth 28a and the engaging portion 32a of the pawl 32. Thus, with full pushing-in of the release knob 38, the operating lever 16 can be smoothly returned to the initial position without the engagement of the pawl 32 with the first engaging tooth 28a, similar to the conventional art.

However, if the operating lever 16 is returned with the release knob 38 being half pushed in, due to insufficient pivotal movement of the pawl 32, there is a possibility that the engaging portion 32a of the pawl 32 may abut onto or come into contact with the first engaging tooth 28a as shown in FIG. 3B. In view of such case, an inclined surface 28c is formed on a protruded portion of the first engaging tooth 28a protruded larger than the other engaging teeth 28 to allow the returning pivotal movement of the operating lever 16 to the initial position thereof. The inclined surface 28c is inclined, relative to a tangential line to the arch centering on the support pin 14, in the direction such that a surface height thereof gradually increases toward the recess 50 i.e., toward the initial position side of the operating lever 16.

However, the inclined angle of the inclined surface 28c is determined gentler than that of a locking surface 28d. Specifically, this inclined angle is selected as the value which allows the pawl 32 to slide on the inclined surface 28c with contacting therewith and the ride-over the first engaging tooth 28a toward the initial position, in the returning pivotal movement of the operating lever 16.

That is, as shown in FIG. 3B, in the engaged state of the engaging portion 32a of the pawl 32 with the inclined surface 28c, the pin 34 constructing the pivotal center of the pawl 32 is positioned at a point such that a line connecting a contacting point between the inclination surface 28c and the engaging portion 32a and the pin 34, and a normal i.e., vertical line at the contacting point on the inclination surface 28c makes an angle θ, toward the brake actuating direction. Thus, the pawl 32 is allowed to pivot about the pin 34 toward the release side i.e., in the clockwise direction.

Also, assuming that the pivotal force applied to the operating lever 16 toward the initial position side is Fr, the inclined angle of the inclined surface 28c is selected i.e., determined, such that a force component Fn acting in a direction where the engaging portion 32a of the pawl 32 rides over the first engaging tooth 28a toward the initial position side or the recess 50 side is larger than a friction force (μ×ft) acting between the inclined surface 28c of the first engaging tooth 28a and the engaging portion 32a of the pawl 32. With this, only by returning pivotal movement of the operating lever 16 toward the initial position side or the recess 50 side without further push-in of the release knob 38, the pawl 32 slides on the inclined surface 28c with contacting therewith to ride over the first engaging tooth 28a toward the initial position side of the operating lever 16. Thus, the operating lever 16 pivots to the initial position thereof. Here, "μ" is a friction coefficient between the first engaging tooth 28a and the pawl 32.

Further, due to the inclined angle of the inclined surface 28c of the first engaging tooth 28a set as described, the release amount D shown in FIG. 3A is not necessarily secured. That is, the operating lever 16 can be returned to the initial position, with the pawl 32 slidably contacting with the inclined surface 28c as shown in FIG. 3A, even in the case the release knob 38 being fully pushed in.

On the other hand, the height of the end portion (lower end) of the inclined surface 28c, that is the height of a boundary area between the inclined surface 28c and a normal engaging surface of the other engaging teeth 28e, has the same height as that of the other engaging teeth 28e. This means that the engaging state i.e., condition of the pawl 32 with the engaging teeth 28 is not changed at the first engaging tooth 28a. As a result, even when the release knob 38 is insufficiently pushed in upon the releasing of the parking brake, the operating lever 16 can be returned securely to the initial position without suffering from the worsened operability as long as it can be pivoted. This effect is rendered by the action of the inclined surface 28f of the first engaging tooth 28a.

As mentioned above, in the parking brake operating apparatus 10 according to this embodiment, firstly the height of the first engaging tooth 28a of the ratchet 30 is determined larger than that of the other engaging teeth 28. Secondary, the actuating force required for pivoting the operating lever 16 in the brake actuating direction is determined larger when the operating lever 16 is pivoted until the pawl 32 rides over the first engaging tooth 28a than when the operating lever 16 is pivoted until the pawl 32 rides over the other engaging teeth 28. For these reasons, the operating lever 16 can hardly be rotated from the initial position to the brake actuating side.

With this, even when the vehicle body largely shakes during the rough road running, the riding-over of the pawl 32 relative to the first engaging tooth 28a resulted from spring-up of the operating lever 16 is suppressed, whereby occurrence of the erroneous lightening of the parking brake lamp or the half actuating state of the parking brake can be prevented. Noted is that in this embodiment, by only heightening the first engaging tooth 28a, the spring-up of the operating lever 16 can be prevented easily and cheaply without affecting the operability upon releasing the parking brake such as push-in of the release knob 38.

Also, in this embodiment, the height of the first engaging tooth 28a is so selected i.e., determined that the predetermined release amount D is left i.e., secured between the inclination surface 28c of the of the first engaging tooth 28a and the engaging portion 32a of the pawl 32, in the fully pushed in state of the release knob 38 to pivot the pawl 32 to the first ride-over position i.e., posture. Accordingly, by fully pushing in the release knob 38 upon releasing of the parking brake, the engaging portion 32a of the pawl 32 does not engage with the first engaging tooth 28a, which allows the smoother returning pivotal movement of the operating lever 16 to the initial position with the same operability as that in the conventional art.

Further, in this embodiment, the protruded portion of the first engaging portion 28a protruding larger than the other engaging teeth 28e is provided with the inclined surface 28c. This inclined surface 28c is configured to allow the sliding contact of the pawl 32 for riding over the first engaging tooth 28a while the pawl 32 comes into contact with the inclined surface 28c upon returning operation of the operating lever 16 toward the initial position side thereof. As a result, as shown in FIG. 3B, even if the pawl 32 unexpectedly engages with the first engaging tooth 28a during returning pivotal movement of the operating lever 16 with half push-in of the release knob 38 to pivot the pawl 32 to the second ride-over position i.e., posture, the pawl 32 having ridden over the other engaging teeth 28e does not go back to side of the engaging teeth 28 i.e., the brake actuating side to engages with the other engaging teeth 28 to be locked.

By only returning the operating lever 16 toward the initial position side, the pawl 32 rides over the first engaging tooth 28a toward the recess 50 side with slidably contacting with the inclined surface 28f. The secure i.e., certain returning of the operating lever 16 to the initial position thus performed can securely prevent the erroneous lightening of the parking brake lamp or half actuating state of the parking brake, without worsening the operability.

In addition, in this embodiment, the space dimension L formed between the abutment surface 28b of the first engaging tooth 28a and the engaging portion 32a of the pawl 32 positioned in the engaging position i.e., posture during the operating lever 16 being held in the initial position is minimized, in the non-actuating state of the parking brake. For example, the space dimension L is determined as zero (L=0) so that the engaging portion 32a of the pawl 32 contacts with the inclined surface 28c of the first engaging tooth 28a. Accordingly, even when the vehicle body largely shakes, the operating lever 16 not influenced by the inertia thereof does not spring up largely before the engagement of the pawl 32 with the first engaging tooth 28a, and the occurrence of riding-over of the pawl 32 relative to the first engaging tooth 28a resulting from spring-up of the operating lever 16, can be satisfactorily prevented. Summing up, by removing the inertia influence with determining the space dimension L=0, the spring-up of the operating lever 16 which allows the pawl 32 to ride over the first engaging tooth 28a can be more securely prevented.

Heretofore, the embodiment of the present invention was explained in detail with reference to the drawings. Needless to say, explained in the above is no more than one embodiment, and accordingly the present invention can be carried out, other than the above embodiment, in various modified modes in accordance with knowledge of the skilled person.

What is claimed is:

1. A parking brake operating apparatus, comprising:
a supporting member disposed integral with a vehicle;
an operating member pivotally supported by the supporting member about a first axis, and actuating a parking brake by moving the operating member from an initial position to a brake actuating position thereof;

a ratchet having a plurality of engaging teeth formed along an arc centering on the first axis, and disposed in the supporting member;

a recess formed in the supporting member at the initial position side adjacent to the ratchet; and a pawl disposed in the operating member, riding over the plurality of engaging teeth toward the brake actuating position during the moving of the operating member, and engaging with the plurality of engaging teeth at the brake actuating position to prevent returning pivotal movement of the operating member toward the initial position side for maintaining an actuating state of the parking brake;

wherein, a first engaging tooth in the plurality of engaging teeth of the ratchet over which the pawl rides first during the moving of the operating member from the initial position is determined higher in a height than other engaging teeth, and is continuous to the recess.

2. A parking brake operating apparatus according to claim 1, wherein in a protruded portion of the first engaging tooth of the ratchet protruding larger than the other engaging teeth, an inclined surface is provided for allowing, in a returning pivotal movement of the operating member, the pawl to ride over the first engaging tooth with slidably contacting therewith.

3. A parking brake operating apparatus according to claim 1, wherein the pivotal force required for pivoting the operating member in the brake actuating direction is determined larger when the operating member is pivoted until the pawl rides over the first engaging tooth than when the operating member is pivoted until the pawl rides over the other engaging teeth.

4. A parking brake operating apparatus according to claim 3, wherein an inclined angle of an inclined surface of the first engaging tooth of the ratchet is selected such that a force component of a force applied from the pawl to the inclination surface in a direction along the inclined surface is larger than a friction force between the inclined surface and the pawl.

5. A parking brake operating apparatus according to claim 4, wherein the pawl has an engaging portion engaging with the recess and teeth bottoms of the other engaging teeth, and is pivotable about a second axis parallel to the first axis.

6. A parking brake operating apparatus according to claim 5, wherein the pawl assumes an engaging posture engaging at the engaging portion thereof with the recess and the teeth bottoms of the other engaging teeth, a first ride-over posture riding over the first engaging tooth, and a second ride-over posture riding over the other engaging teeth.

7. A parking brake operating apparatus according to claim 6, wherein in the returning pivotal movement of the operating member with the pawl being held at the first ride-over posture, the engaging portion of the pawl does not contact with the inclined surface.

8. A parking brake operating apparatus according to claim 7, wherein when the pawl is held in the engaging posture with the operating member being held in the initial position, the engaging portion of the pawl comes into contact with a contacting surface of the first engaging tooth at side of the recess.

9. A parking brake operating apparatus according to claim 8, wherein the operating member further including a stopper abutting onto the supporting member to determine the initial position of the operating member.

* * * * *